United States Patent [19]
Ueda

[11] Patent Number: 5,764,631
[45] Date of Patent: Jun. 9, 1998

[54] MOBILE COMMUNICATION SYSTEM AND A METHOD OF MOBILE COMMUNICATION

[75] Inventor: Tetsuro Ueda, Tokyo, Japan

[73] Assignee: NEC Corporation, Tokyo, Japan

[21] Appl. No.: 661,016

[22] Filed: Jun. 10, 1996

[30] Foreign Application Priority Data

Jun. 15, 1995 [JP] Japan ................... 7-148456

[51] Int. Cl.$^6$ ....................................... H04Q 9/00
[52] U.S. Cl. ........................... 370/332; 370/337; 455/437
[58] Field of Search ........................ 370/465, 468,
370/331–333, 337; 455/436, 437, 439,
440, 442, 423, 62, 515, 525

[56] References Cited

U.S. PATENT DOCUMENTS

| | | | |
|---|---|---|---|
| 5,157,661 | 10/1992 | Kanai et al. | 370/331 |
| 5,231,632 | 7/1993 | Yamao et al. | 370/331 |
| 5,404,573 | 4/1995 | Yabe et al. | 370/332 |
| 5,416,778 | 5/1995 | Chan et al. | 370/332 |
| 5,493,563 | 2/1996 | Rozanski et al. | 370/332 |

FOREIGN PATENT DOCUMENTS

| | | |
|---|---|---|
| 6455924 | 3/1989 | Japan . |
| 1238329 | 9/1989 | Japan . |
| 429495 | 1/1992 | Japan . |
| 575531 | 3/1993 | Japan . |

OTHER PUBLICATIONS

"The Second–Generation Cordless Telephone System, Standard Specification"; 1st Ed.; The Research & Development Center for Radio Systems Foundation; pp. 376–377.

*Primary Examiner*—Chau Nguyen
*Attorney, Agent, or Firm*—Whitham, Curtis & Whitham

[57] ABSTRACT

A mobile communication system and a method thereof which is capable of performing the base station change over operation with minimum communication interruption is provided. Communication between a base station and a mobile station is performed by using time slots of the Time Division Multiple Access transmission system. The mobile station monitors time slots of the control carrier for base stations around the mobile station during periods of time slots for other than the current speech channel. As for monitoring a control slot in the same timing as the speech channel, the monitoring is performed during VOX periods, in which no voice signal exists. Since the control carrier state can be monitored during communication with the original base station, interruption of communication to change over to a new base station can be minimized.

13 Claims, 8 Drawing Sheets

MOBILE COMMUNICATION SYSTEM AND A METHOD OF MOBILE COMMUNICATION

BACKGROUND OF THE INVENTION

1. Field of the Invention

The present invention relates to a mobile communication system and a method thereof covering a service area with a plurality of base stations which provide radio zones and performs communication between the base stations and mobile stations, and, more particularly, to a mobile communication system and a method thereof in which a mobile station monitors a communication quality or receiving signal level of radio signal from base stations and selects an appropriate base station for communication during moving.

2. Description of the Related Art

In a mobile communication system, in order to effectively use a frequency, its service area is finely divided into a plurality of radio zones so that the same frequency is used for communication at the respective base stations in the radio zone which are apart from each other as far as they do not interfere with each other. In particular, a personal handy-phone system which has been put in practical use in recent years has finely divided radio zones, and therefore a mobile station frequently changes over a base station (i.e., radio frequency for communication) to be communicated with while it is moving. Also, in the mobile communication system such as the personal handy-phone system, its communication system is digitized a TDMA (Time Division Multiple Access) transmission system, a plurality of speech channels are multiplexed in a time-division manner in each radio frequency for communication, is adopted for communication between base stations and mobile stations. The mobile station is so designed as to monitor a communication quality and a reception level of radio signals transmitted from base stations, and, to change over from a base station under communication to another base station when the communication quality is degraded.

FIG. 1 is a diagram showing an operation sequence when a mobile station changes over a base station for its communication. A mobile station 102 under communication with the base station 101 always monitors the receive signal level and the communication quality of a speech channel currently being used. The mobile station 102 sends out a speech channel changeover request signal 103 to the base station 101 when the receive level and the communication quality are deteriorated lower than predetermined values, respectively. Upon receiving the changeover request signal 103, the base station 101 sends out a channel changeover instruction signal 104 to the mobile station 102. After receiving the channel changeover instruction signal 104, the mobile station 102 carries out an observation operation 105 of control carriers and inspects the receive level of radio signals transmitted from base stations around the mobile station 102.

For control carriers, one frequency is assigned to all the base stations, and a time-division multiplexed time slot is assigned to each base station. Each base station is so designed as to send out a control signal to the time slot assigned thereto. A time slot for sending out the control signal through the control carriers is called "a control slot" in this specification. The mobile station monitors the receive levels of all the base stations around the mobile station by monitoring one frequency for control carriers.

The mobile station 102 sequentially observes the control slots on each control carrier, detects a base station corresponding to the control slot a receive level of which exceeds a predetermined value, and selects the detected base station as a target base station 106 for change over. The mobile station 102 originates a call 107 to the target base station 106 for change over to resume communication through the base station 106. Such a mobile communication system has been disclosed in "The Second-Generation Cordless Telephone System, Standard Specification, the first edition, pp. 376 to 377, published by The Research & Development Center for Radio Systems Foundation.

The change over operation sequence in which searching a subsequent base station for changing over after interruption of communication with the original base station extends the communication interruption period. Under such circumstances, there have been a variety of proposals by which the communication interruption period when changing over is shortened and the changeover of base stations with the movement of the mobile station is performed more smoothly.

Japanese Patent Laid Open No. Hei 4-29495 discloses a mobile communication system that performs a communication test between a mobile station and a target base station for change over during a waiting period since receiving a time slot of speech channel until a subsequent time slot which will be received in one cycle period later. Because the communication test can be performed between the mobile station and another base station during the waiting period of the time slot for communication with the original base station in the speech channel, the communication interruption period caused by the changing over operation can be shortened.

Also, Japanese Patent Laid Open No. Hei 1-238329 discloses a mobile communication system in which a time slot of a speech channel for communication with the target base station is to be allocated in the position which is apart from a time slot under communication by a predetermined period later. Similarly, in that mobile communication system, a communication test is also performed during a waiting period, but, allocation of a time slot of a speech channel for communication with the target base station is prevented from adjoining a time slot of speech channel under communication with the original base station. If there is a time difference necessary for changing over a speech channel between the time slots for original communication and new communication, the channel changeover need not be performed at high speed, thereby simplifying circuits in a communication aparatus.

In addition, Japanese Patent Laid Open No. Sho 64-55924 discloses a mobile communication system which is designed in such a manner that the number of multiplexed time slots for communication carriers and the number of multiplexed time slots for control carriers are set to different values respectively, so that the state of all the control slots can be observed during the waiting period. If the number of multiplexed time slots for communication carriers and the number of multiplexed time slots for control carriers are identical to each other, the control slot at the same timing as that of the time slot for communication carriers cannot be observed. However, if the number of multiplexed time slots is set to a difference value therebetween, whereby the control slot that has the same timing as that of the time slot for the communication carrier is replaced with the different time slot for the communication carrier in every one cycle period. Accordingly, with the observation of the control carriers over a plurality of cycle of periods, a communication test can be performed on all the control slots.

Also, Japanese Patent Laid Open No. Hei 5-75531 discloses a mobile communication system which is so designed that a radio frequency is changed over for the alternation of a base station, using a period during which communication is in a silent state (no voice signal exists). In the communication system having a voice operated transmission (hereinafter referred to as "VOX") function by which the mobile station under communication stops a transmission output in accordance with the presence/absence of voice signal, a frequency is changed over using a transmission stop period (hereinafter referred to as a "VOX period") due to silence.

In the related art disclosed in Japanese Patent Laid Open No. Hei 4-29495 or Japanese Patent Laid Open Hei 1-238329, a communication test cannot be performed on the control slot which is assigned at the same timing as that of the time slot under current communication. For that reason, after communication between the mobile station and the original base station has been interrupted, it is necessary that at least a communication state of the control slot at that timing is observed, which leads to such a problem that the interruption of communication when changing over the base station cannot be sufficiently shortened.

In the prior art disclosed in Japanese Patent Laid Open No. Sho 64-55924, a communication state can be observed on all the control slots using a waiting period by providing different a number of multiplexed time slots for the communication carrier and the control carrier. However, the number of multiplexed time slots is different therebetween, and this lowers not only the flexibility of the communication system, but also greatly alters the present technical specifications required in adapting it to the second generation cordless telephone system.

In the related art disclosed in Japanese Patent Laid Open No. Hei 5-75531, the base stations can be changed during a VOX period which is a silent period. However, the control slot still must be observed to determine the target base station for change over. Thus communication must be interrupted for observing the control slot.

SUMMARY OF THE INVENTION

In view of the above, the present invention solves such problems, and provides a mobile communication system which is capable of changing over to an optimum base station in a minimal of communication interruption period.

A mobile communication system according to the present invention is for the system which provides a service area by a plurality of base stations each providing a radio zone in which a mobile station communicates with the base station using a Time Division Multiple Access transmission system, and the mobile communication system comprises the following elements:

(1) communication means for providing a plurality of time divisioned speech time slots in a radio frequency for speech channels for communication between a mobile station and a base station in a radio zone, and a plurality of time divisioned control time slots in a radio frequency for control channels transmitting and receiving control information between a mobile station and a plurality of base stations around the mobile station;

(2) the mobile station including
  a. first communication state observing means for observing each control time slot for monitoring communication states between the mobile station and base stations around the mobile station during time periods other than a time period for the speech time slot currently being used;
  b. silent state detecting means for detecting a silent period, in which no voice signal exists, in a predetermined time interval in a speech time slot;
  c. second communication state observing means for observing a control time slot for monitoring communication states between the mobile station and a first base station, whose control time slot is in the same timing as the speech time slot currently being used, during silent periods when the silent state detecting means has detected; and
  d. base station changeover means for changing over the first base station to a second base station from which a best communication state is obtained on the basis of observation results of the first communication state observing means and the second communication state observing means.

A method of mobile communication according to the present invention is for a mobile communication system which provides a service area by a plurality of base stations each providing a radio zone in which a mobile station communicates with the base station using a Time Division Multiple Access transmission system, providing a plurality of time divisioned speech time slots in a radio frequency for speech channels for communication between a mobile station and a base station in a radio zone, and a plurality of time divisioned control time slots in a radio frequency for control channels transmitting and receiving control information between a mobile station and a plurality of base stations around the mobile station. The method comprises the following steps:

(1) first observing each control time slot for monitoring communication states between the mobile station and base stations around the mobile station during time periods other than a time period for the speech time slot currently being used;

(2) detecting a silent period, in which no voice signal exists, in a predetermined time interval in a speech time slot;

(3) second observing a control time slot for monitoring communication states between the mobile station and a first base station, whose control time slot is in the same timing as the speech time slot currently being used, during silent periods having been detected; and (4) changing over the first base station to a second base station from which a best communication state is obtained on the basis of observation results of the first observing and second observing steps.

In other words, in the present invention, the communication states between the mobile station and all the base stations around the mobile station can be checked while communicating with the original base station so that the communication interruption period for changing over the base station is shortened.

DETAILED DESCRIPTION OF THE PREFERRED EMBODIMENTS

The present invention will be described in the following by referring to the attached drawings.

Figure 1:
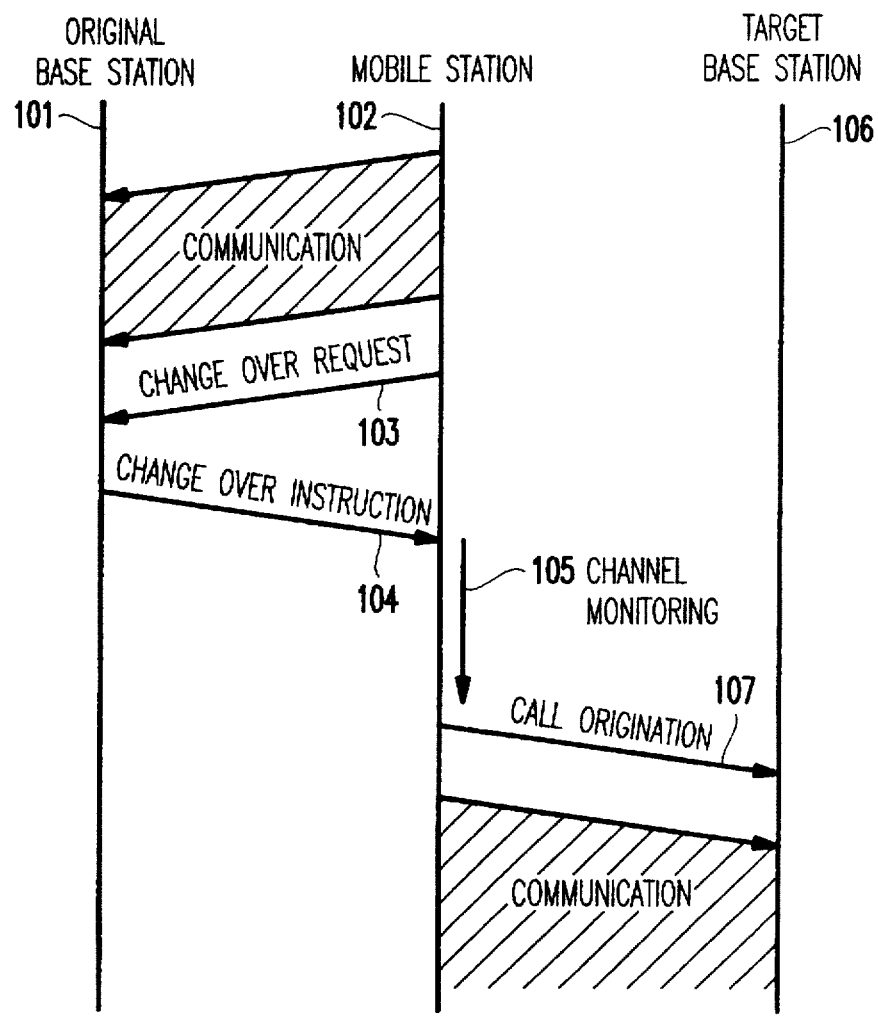
FIG. 1 is an explanatory diagram showing a communication sequence when a mobile station changes over a base station to be communicated in a conventional mobile communication system.
Figure 2:
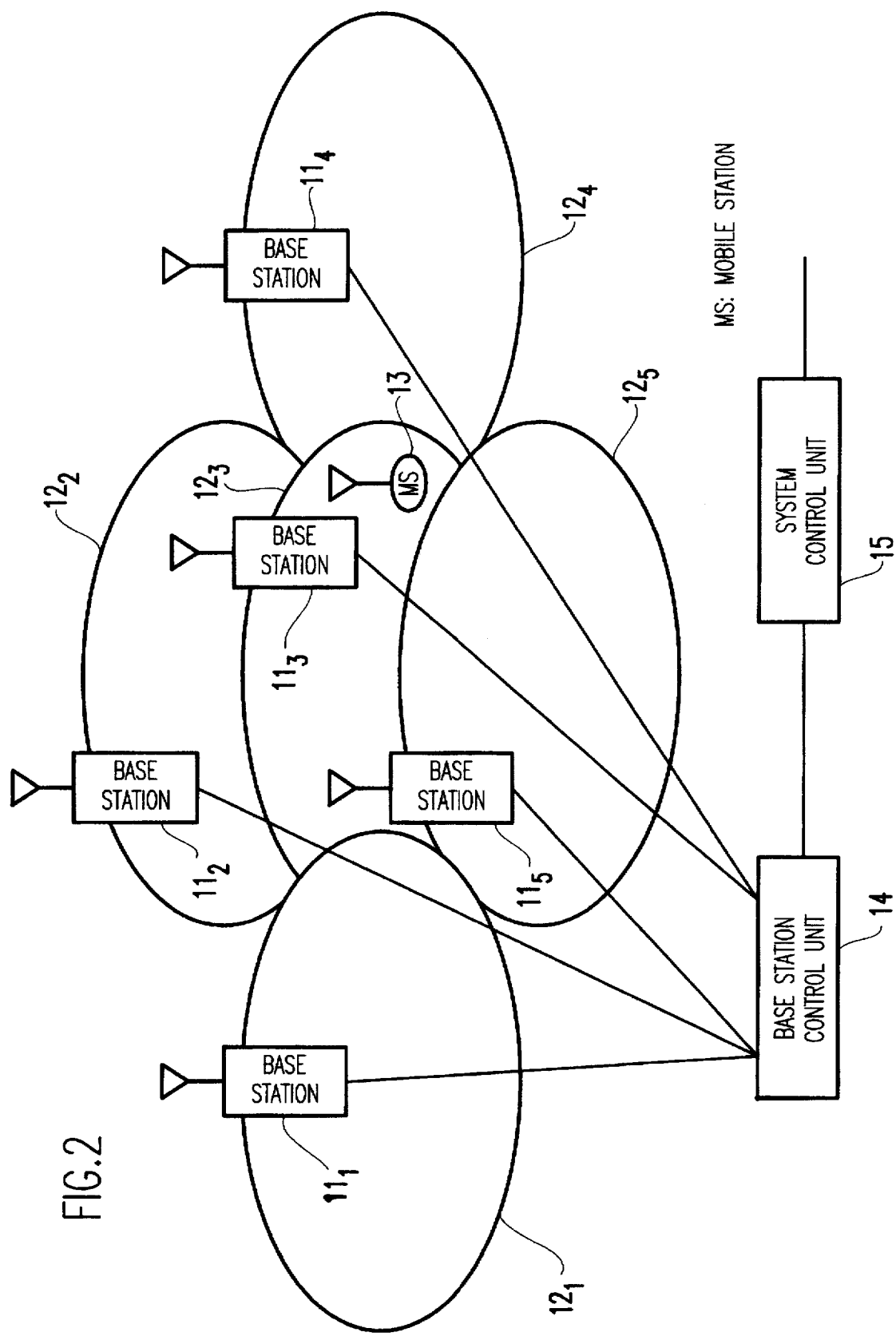
FIG. 2 is an explanatory diagram showing the area structure of a mobile communication system in accordance with one embodiment of the present invention.

FIG. 2 is a diagram showing the structure of a mobile communication system in accordance with one embodiment of the present invention. Base stations $11_1$ to $11_5$ provide radio zones $12_1$ to $12_5$, respectively for covering a service area of the mobile communication system. The adjacent radio zones overlap with each other so that the base station is changed over in the overlap area when a mobile station 13 moves between the radio zones. The respective base stations $11_1$ to $11_5$ are connected to a base station control unit 14 for managing those base stations $11_1$ to $11_5$. The base station control unit 14 is connected to another mobile communication system or a fixed communication network through a system control unit 15.

Figure 3:
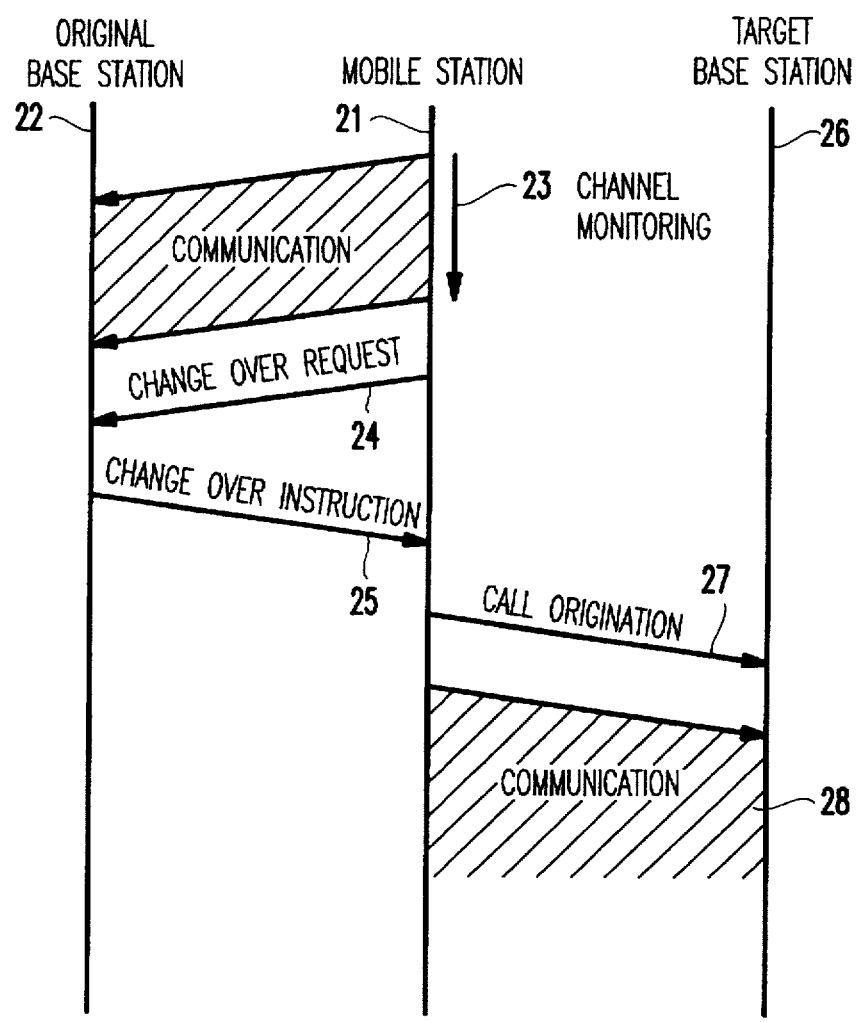
FIG. 3 is an explanatory diagram showing one example of a communication sequence in changing over the base station in the mobile communication system in accordance with the present invention.

FIG. 3 is a diagram showing one example of a communication sequence in changing over the base station in the mobile communication system in accordance with the present invention. Each frequency used for communication between the base station and the mobile station is multiplexed in time division into a plurality of time slots, respectively.

The communication carriers are frequencies used for speech channels corresponding to a plurality of time slots.

Control carriers used for transmitting a variety of control signals are multiplexed in time division, and one frequency is commonly used for the control carriers in a plurality of base stations. It means that the communication states between the mobile station and all the base stations around the mobile station can be observed by monitoring only one frequency of the control carrier.

A VOX function is provided for an upward channel (channel direction from mobile station to base station) and a downward channel (channel direction from base station to mobile station), respectively. Both of the base station and the mobile station include a VOX burst signal transmission function. The VOX burst signal transmission function is a function to transmit background noise information or the like, using a VOX period.

The mobile station 21 performs an observation 23 of the control carrier for discriminating the communication state between the mobile station 21 and the base stations around the mobile station 21 simultaneously during communication with the base station 22. A control slot having a timing different from that of the time slot of speech channel is observed while waiting for the time slot of the speech channel, to thereby check the communication state. A control slot having the timing identical to that of the time slot of the speech channel is observed using the VOX period where it is in a silent (no voice signal exists) state.

Information such as background noise is transmitted by the VOX burst signal, and when a VOX period continues over a plurality of period cycles, it is unnecessary to transmit the VOX burst signal in every cycle. During a silent section (VOX periods), the VOX burst signal is transmitted and received only once per two or four frames, and other VOX periods are assigned for observing the carrier level of a control slot. Also, the communication state of the speech channel, for example, the receive level, is monitored during communication, and when the receive quality is deteriorated, a changeover request signal 24 is transmitted to an original base station 22 under communication. In response thereto, upon receiving a changeover instruction signal 25 from the original station 22, the mobile station 21 selects a target base station 26 for changing over on the basis of the result of the observation 23 of the control carrier performed during communication, and originates a call request 27 to that target base station 26. Then, communication 28 with new base station 26 is commenced.

Figure 4:
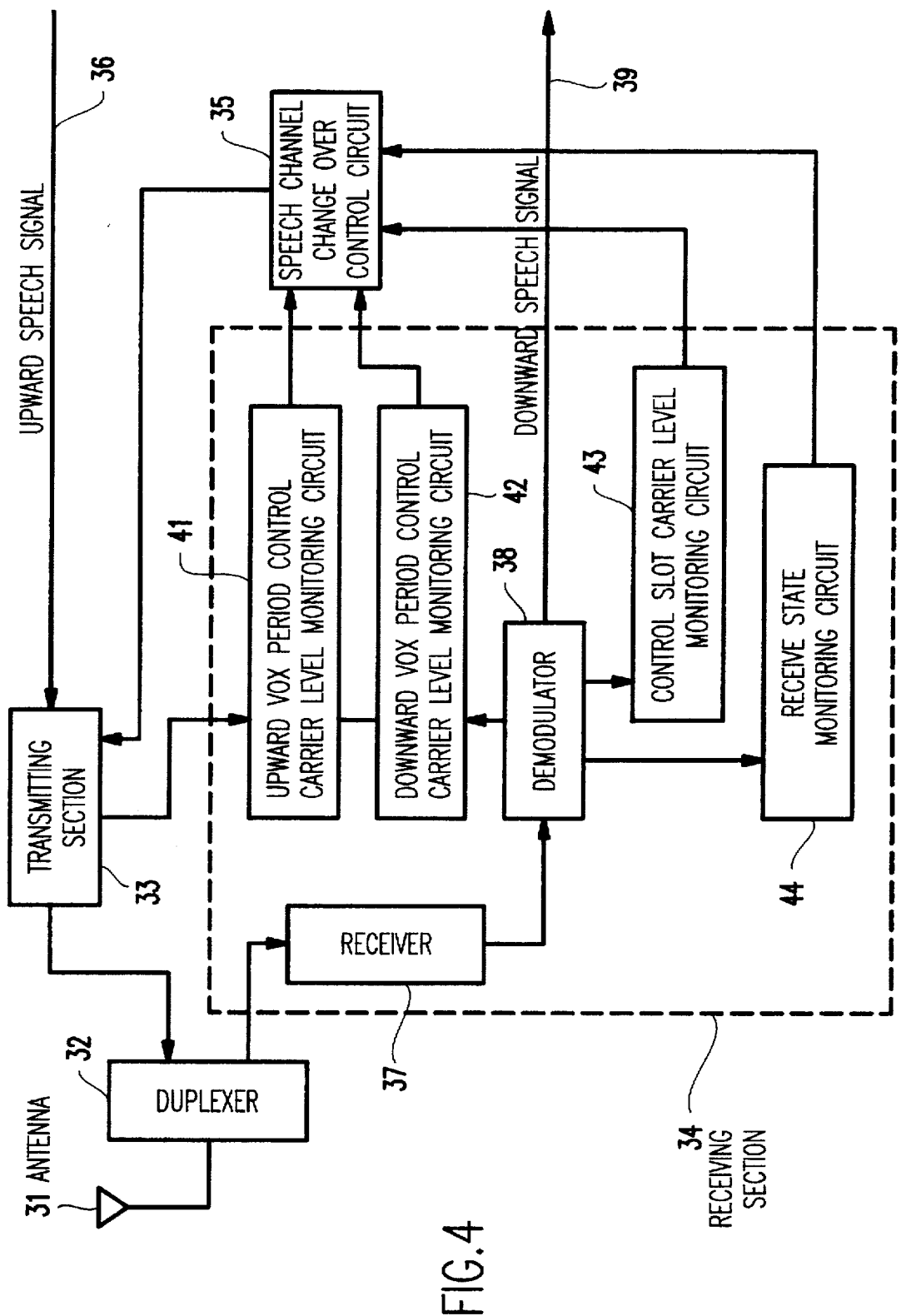
FIG. 4 is a circuit diagram showing the outline of a circuit structure of a mobile station in the mobile communication system in accordance with the present invention.

FIG. 4 is a circuit diagram showing the outline of a circuit structure of a mobile station in the mobile communication system of the above-mentioned communication sequence. A mobile station is comprised of an antenna 31, a duplexer 32 for using the antenna for transmission and reception, a transmitting section 33 for processing a transmission signal, a receiving section 34 for processing a reception signal; and a speech channel changeover control circuit 35 for controlling the operation of changing over a speech channel. An upward speech signal 36 inputted from a voice transmitter not shown is processed through the transmitting section 33 in such a manner that it forms one frame every 5 milli-sec, and digitized. The digital speech signal for one frame is compressed in time and put in one time slot of the speech channel.

A signal from the antenna 31 is received by a receiver 37 of the receiving section 34 through the duplexer 32. The received signal by the receiver 37 is transferred to demodulator 38 for demodulating that received signal, and the demodulated downward speech signal 39 is transferred to a receiver not shown. The demodulator 38 is provided with a function of discriminating whether the time slot having been received contains a voice signal or not. An upward VOX period control carrier level monitoring circuit 41 is a circuit for observing a control carrier level in the control slot having the same timing as that of the speech channel when the upward speech signal 36 is in a silent state (no voice signal exists). A downward VOX period control carrier level monitoring circuit 42 is a circuit for monitoring the carrier level of the control slot having the same timing as that of the time slot for a speech channel for which a silent state has been detected by the demodulator 38.

A control slot carrier level monitoring circuit 43 is a circuit for observing the carrier level of the control slot having a timing different from that of the time slot for the speech channel. A receive state monitoring circuit 44 is a circuit for monitoring the communication quality of the speech channel. A speech channel changeover control circuit 35 has a function of selecting an optimum base station as a target base station for changing over on the basis of the monitored results of the upward and downward VOX period control carrier level monitoring circuits 41, 42, and control slot carrier level monitoring circuit 43. When the speech channel changeover control circuit 35 is notified of the deterioration of the communication quality of the speech channel from the receive state monitoring circuit 44, it changes over the speech channel to the optimum base station selected on the basis of the monitored results during communication.

The receiver 37 and the demodulator 38 are commonly used in any one of the reception of the time slot for the speech channel, the reception of the time slot for the control carrier at a timing different from that of the speech time slot, and the reception of the time slot for the control carrier at a timing identical to that of the speech channel but the speech time slot is in the VOX period. In other words, when receiving the time slot for the speech channel, the frequency of the receiver 37 is set to a radio channel of the speech channel, and when receiving the time slot for the control carrier, it is set to the frequency of the radio channel of the control carrier.

Figure 5:
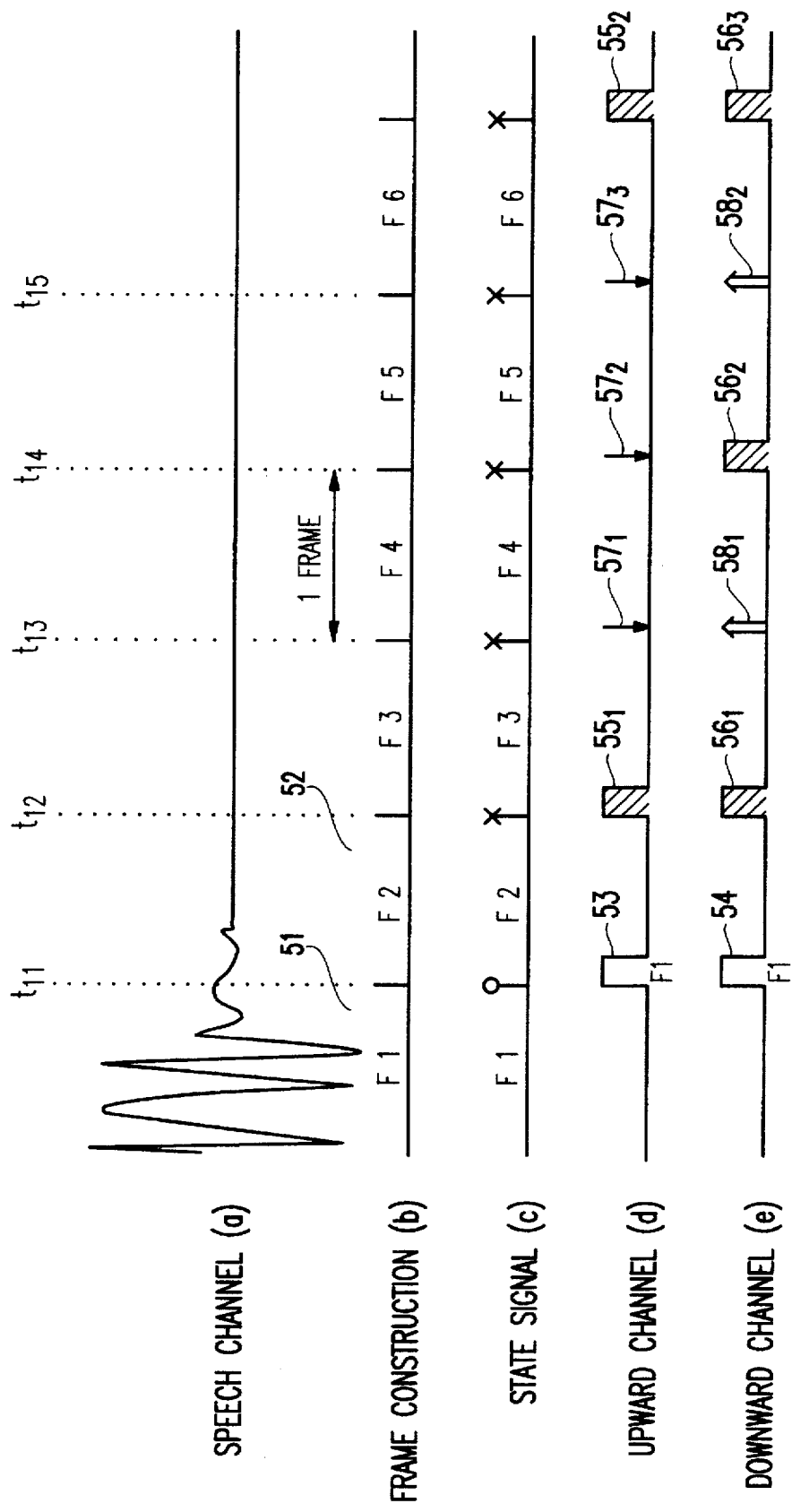
FIG. 5 is a timing chart showing the state of each signal when a speech state is changed from a voice state to a silent state.

FIG. 5 is a timing chart showing the state transition of each signal when the state of the speech channel is changed from a voice state to a silent state. A signal in a speech channel, (a) in FIG. 5, is in a voice state until a timing $T_{11}$ and thereafter changed into a silent state. The signal in the speech channel is formed into frames for every 5 milli-sec, (b) in FIG. 5. The signal is converted into a digital signal for each frame and then compressed in time before being assigned to each time slot. The mobile station or the base station detects whether the signal in a speech channel is in the silent state or not, for each frame, and outputs a silent state detection signal, (c) in FIG. 5, at a time point between the adjacent frame. In the figure, a mark O represents that the voice state is detected, whereas a mark X represents that the silent state (no voice signal exists for the whole frame period) is detected. Since a frame 51 before a timing $T_{11}$ includes a voice signal, the voice state is detected at the timing $T_{11}$. In a frame 52 after the voice signal has stopped, the silent state is detected at a timing $T_{12}$.

A signal, (d) in FIG. 5, of the upward channel, which is sent from the mobile station to the base station, transmits the voice signal of the frame 51 as an upward burst signal 53 in one time slot. Similarly, a signal, (e) in FIG. 5, of the downward channel, which is sent from the base station to the mobile station, transmits a voice signal as a downward burst signal 54. In a period of the time slot after the silent state has been detected, the VOX burst signals 55 and 56 are transmitted.

In the upward channel, the VOX burst signal is sent out for every four frames, and in the downward channel, the VOX burst signal is sent out for every two frames. In FIG. 5, a time slot indicated by oblique lines represents that the VOX burst signal is transmitted. In the VOX periods, the silent state is detected and transmission is stopped, at times $T_{13}$, $T_{14}$ and $T_{15}$ where the VOX burst signal is not transmitted, the reception frequency is changed over to that of the control carrier, and the carrier level of the control slot having a timing identical to that of the speech time slot is observed. Downward arrows $57_1$ to $57_3$ in (d) of FIG. 5 represent that the downward control carrier level has been observed in the VOX period of the transmit slot of the mobile station. Also, upward arrows $58_1$ to $58_3$ in (e) of FIG. 5 represent that the downward carrier level has been observed in the VOX period of the receive slot of the mobile station.

Figure 6:
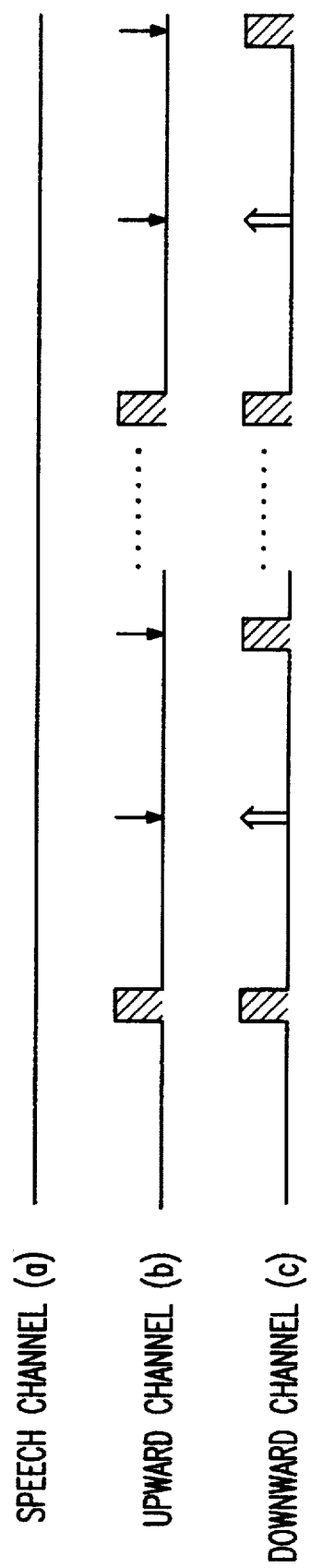
FIG. 6 is a timing chart showing the state of each signal when the silent state continues.

FIG. 6 is a timing chart showing the state of each signal when the silent state continues. A signal in the speech channel, (a) in FIG. 6, continues to be a silent state. During this state, in an upward channel, (b) in FIG. 6, the VOX burst signal is transmitted once per four frames, and in the VOX period for the remaining three frames, a downward control carrier is measured. In a downward channel, (c) in FIG. 6, the VOX burst signal is transmitted once per two frames, and in other VOX periods, the upward control carrier is observed. It is needless to say that the control carrier is always observed during communication at a timing of time slots used for other than a current speech channel.

Figure 7:
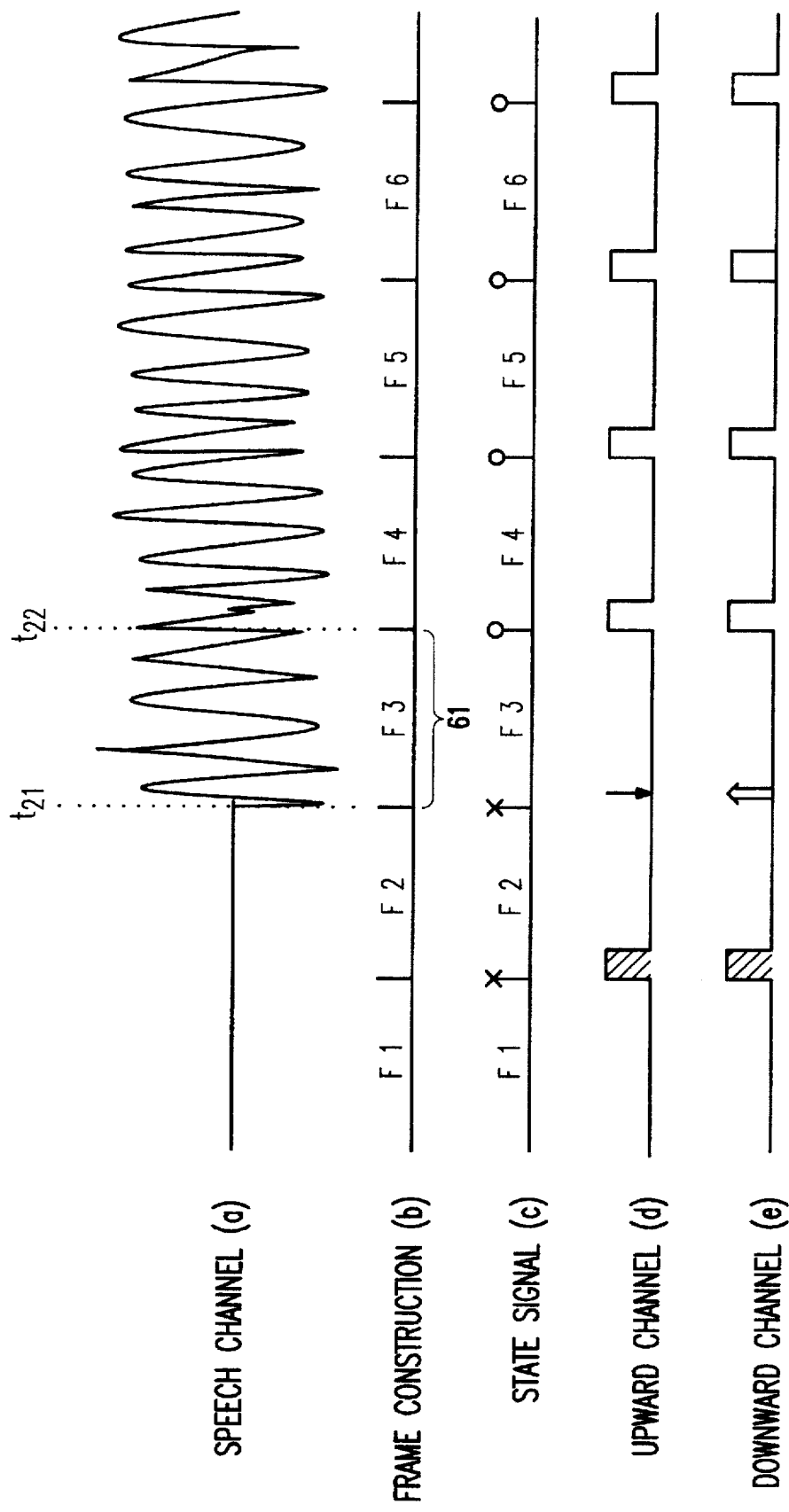
FIG. 7 is a timing chart showing the state of each signal when the state changes from a silent state to a voice state.

FIG. 7 is a timing chart showing the state of each signal when the state changes from a silent state to a voice state. A signal in the speech channel, (a) in FIG. 7, is in a silent state until a time $T_{21}$, and thereafter changed in a voice state. The voice signal is divided into frames for every 5 milli-sec, (b) in FIG. 7, and it is detected whether each frame has voice or silence. In the voice state detection signal, (c) in FIG. 7, a mark 0 represents that a voice state is detected, whereas a mark X represents that a silent state is detected, as in the case of FIG. 5. Since a frame 61 is a frame that has changed from the silent state to the voice state, the voice state is detected at a time $T_{22}$.

Upon detecting the voice state, the transmission of the VOX burst signal or the measurement of the carrier level of the control slot is stopped, and the transmission/reception of voice signals is performed. It can be discriminated whether it is a voice burst signal, a VOX burst signal or a VOX period where the transmission operation is stopped so that none of the voice burst signal and the VOX burst signal exists, by analyzing the top portion of each time slot. The demodulator 38 of the mobile station analyzes the top portion of a signal of a communication time slot for each cycle period, and discriminates whether that signal is voice, the VOX burst or the VOX period. Then, when it is discriminated that it is the VOX period, the control carrier is measured in its burst period. Hence, the voice signal can be normally received even though the state is changed into the voice state from the time slot of a period succeeding the VOX burst signal.

In this way, since the time slot in the silent state is used, the communication state of all the time slots of the control carrier can be checked during communication with the original base station. Then, when detecting the deterioration of the reception level of the communication channel during communication, or when detecting the control slot on the control carrier whose reception level is stronger than that of the communication channel during communication, an original base station is changed to a second base station having a better communication state. As a result an, interruption period of communication can be made shorter than that in a case where the communication state of each control slot is checked after communication with the original base station is interrupted.

Figure 8:
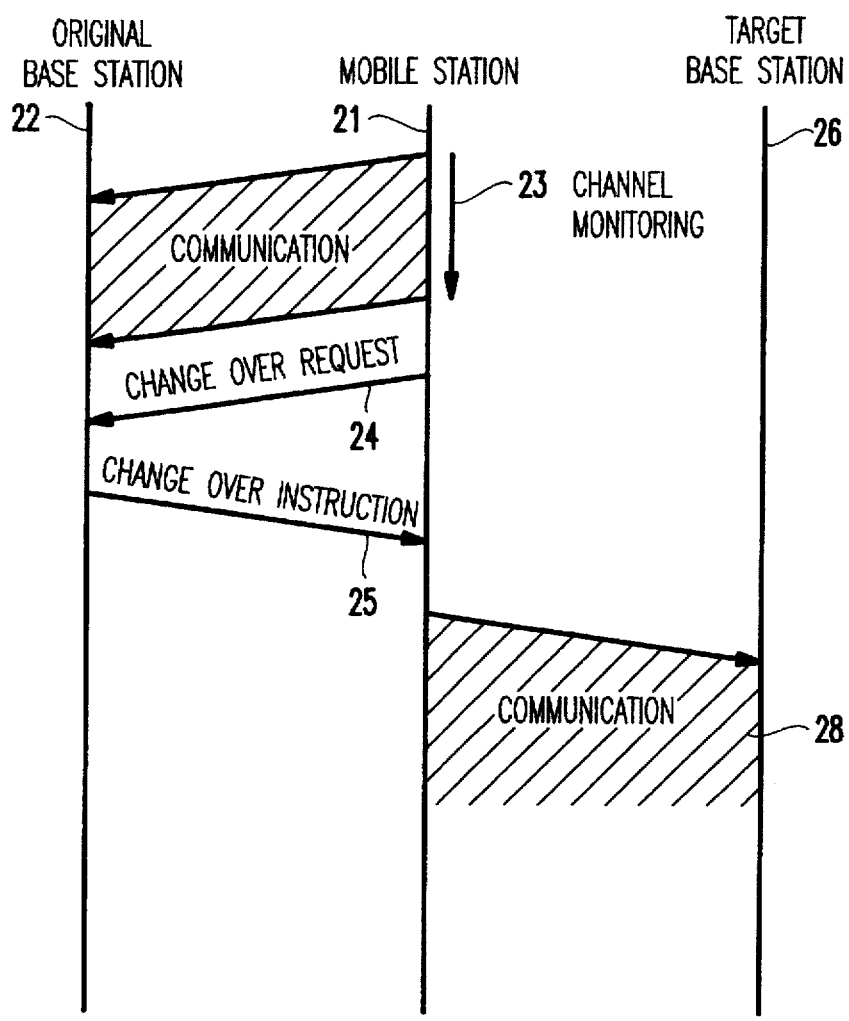
FIG. 8 is an explanatory diagram showing the communication sequence in the mobile communication system where the changeover of a base station is performed by changing over the communication channel.

FIG. 8 is a diagram showing the communication sequence in the mobile communication system where the change-over of base station is performed by changing over the communication channel. The same portions as those in the communication sequence shown in FIG. 3 are represented by the same symbols, and its description will be omitted appropriately. Similarly, in this mobile communication system, the levels of all the control slots are measured during communication. Then, in the case where the communication state between the mobile station and the original base station 22 is deteriorated, the mobile station sends out the changeover request signal 24 to the original base station 22, and receives the changeover instruction signal 25. The base station can be changed by simply changing over the communication channel without additionally originating a call to the target base station. Hence, the communication interruption period due to the changeover of the base station can be further shortened.

In the embodiment described above, the voice signal in a speech channel is divided as one frame for 5 milli-sec. However, the length of one frame is not limited thereto or thereby. Also, in the above-mentioned embodiment, several VOX periods are assigned to the transmission of the VOX burst signal. However, the control carrier may be observed in all the VOX periods.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A mobile communication system providing a service area by a plurality of base stations each providing a radio zone in which a mobile station communicates with the base station using a Time-Division Multiple Access transmission system, said mobile communication system comprising:

communication means for providing a plurality of time-division speech time slots in a radio frequency for speech channels for communication between a mobile station and a base station in a radio zone, and a plurality of time-divisioned control time slots in a radio frequency for control channels transmitting and receiving control information between a mobile station and a plurality of base stations adjacent the mobile station;

said mobile station including:

first communication state observing means for observing each control time slot for monitoring communication states between the mobile station and base stations adjacent the mobile station during time periods other than a time period for the speech time slot currently being used, wherein said first communication state observing means comprises a control slot carrier level monitoring circuit;

silent state detecting means for detecting a silent period, during which no voice signal exists, in a predetermined time interval in a speech time slot, wherein said silent state detecting means comprises a demodulator;

second communication state observing means for observing a control time slot for monitoring communication states between the mobile station and a first base station, whose control time slot is in the same timing as the speech time slot currently being used, during silent periods when said silent state detecting means has detected a silent state;

a received state monitoring circuit for monitoring a communication quality of a speech channel; and base station changeover means for changing over said first base station to a second base station from which a best communication state is obtained on the basis of observation results of said first communication state observing means and said second communication state observing means.

2. A mobile communication system providing a service area by a plurality of base stations each providing a radio zone in which a mobile station communicates with the base station using a Time-Division Multiple Access transmission system, said mobile communication system comprising:

communication means for providing a plurality of time-division speech time slots in a radio frequency for speech channels for communication between a mobile station and a base station in a radio zone, and a plurality of time-divisioned control time slots in a radio frequency for control channels transmitting and receiving control information between a mobile station and a plurality of base stations adjacent the mobile station:

said mobile station including:

first communication state observing means for observing each control time slot for monitoring communication states between the mobile station and base stations adjacent the mobile station during time periods other than a time period for the speech time slot currently being used, wherein said first communication state observing means comprises a control slot carrier level monitoring circuit;

silent state detecting means for detecting a silent period, during which no voice signal exists, in a predetermined time interval in a speech time slot;

second communication state observing means for observing a control time slot for monitoring communication states between the mobile station and a first base station, whose control time slot is in the same timing as the speech time slot currently being used, during silent periods when said silent state detecting means has detected a silent state, wherein said second communication state observing means comprises an upward VOX period control carrier level monitoring circuit and a downward VOX period control carrier level monitoring circuit;

base station changeover means for changing over said first base station to a second base station from which a best communication state is obtained on the basis of observation results of said first communication state observing means and said second communication state observing means, wherein said base station changeover means comprises a speech channel changeover control circuit for selecting an optimum base station as a target base station for changing over based on monitored results of the upward and downward VOX period control carrier level monitoring circuits and said control slot carrier level monitoring circuit; and a received state monitoring circuit, coupled to said silent state detecting means, for monitoring a communication quality of a speech channel.

3. The mobile communication system according to claim 2, wherein when the speech channel changeover control circuit is notified of deterioration of the communication quality of the speech channel from said received state monitoring circuit, said speech channel changeover control circuit changes over the speech channel to the optimum base station selected based on the monitored results during communication.

4. A mobile communication system providing a service area by a plurality of base stations each providing a radio zone in which a mobile station communicates with the base station using a Time-Division Multiple Access transmission system, said mobile communication system comprising:

communication means for providing a plurality of time-division speech time slots in a radio frequency for speech channels for communication between a mobile station and a base station in a radio zone, and a plurality of time-divisioned control time slots in a radio frequency for control channels transmitting and receiving control information between a mobile station and a plurality of base stations adjacent the mobile station;

said mobile station including:

first communication state observing means for observing each control time slot for monitoring communication states between the mobile station and base stations adjacent the mobile station during time periods other than a time period for the speech time slot currently being used;

silent state detecting means for detecting a silent period, during which no voice signal exists, in a predetermined time interval in a speech time slot, wherein said silent state detecting means detects whether a voice signal is in a silent state or not for each frame, and outputs a silent state detection signal, and wherein said silent state detecting means comprises a demodulator for analyzing a top portion of a signal of a communication time slot for each cycle period, and for discriminating whether said signal is one of voice, a VOX burst, and a VOX period, wherein when it is discriminated that the VOX period exists, a control carrier is measured during its burst period, whereby a voice signal is received even though a state is changed into a voice state from a time slot of a period succeeding the VOX burst;

second communication state observing means for observing a control time slot for monitoring communication states between the mobile station and a first base station, whose control time slot is in the same timing as the speech time slot currently being used, during silent periods when said silent state detecting means has detected a silent state; and base station changeover means for changing over said first base station to a second base station from which a best communication state is obtained on the basis of observation results of said first communication state observing means and said second communication state observing means.

5. The mobile communication system according to claim 4, wherein usage of a time slot in a silent state allows the communication state of all the time slots of the control carrier to be checked during communication with the first base station, wherein upon occurrence of one of detecting deterioration of a reception level of the communication channel during communication, and when detecting the control slot on the control carrier whose reception level is stronger than that of the communication channel during communication, the first base station is changed to said second base station.

6. A method of mobile communication in a mobile communication system providing a service area by a plurality of base stations each providing a radio zone in which a mobile station communicates with the base station using a Time-Division Multiple Access transmission system, providing a plurality of time-divisioned speech time slots in a radio frequency for speech channels for communication between a mobile station and a base station in a radio zone, and a plurality of time-divisioned control time slots in a radio frequency for control channels transmitting and receiving control information between a mobile station and a plurality of base stations adjacent the mobile station, said method comprising the steps of:

first observing each control time slot for monitoring communication states between the mobile station and base stations adjacent the mobile station during time periods other than a time period for the speech time slot currently being used;

detecting a silent period, during which no voice signal exists, in a predetermined time interval in a speech time slot, wherein said silent period detecting step detects whether a voice signal is in a silent state or not for each frame, and wherein said silent period detecting step comprises a step of analyzing a top portion of a signal of a communication time slot for each cycle period, and a step of discriminating whether said signal is one of voice, a VOX burst, and a VOX period, wherein when it is discriminated that the VOX period exists, a control carrier is measured during its burst period, whereby a voice signal is received even though a state is changed into a voice state from a time slot of a period succeeding the VOX burst;

second observing a control time slot for monitoring communication states between the mobile station and a first base station, whose control time slot is in the same timing as the speech time slot currently being used, during silent periods having been detected; and changing over said first base station to a second base station from which a best communication stat is obtained on the basis of observation results of said first observing step and said second observing step.

7. The method according to claim 6, wherein usage of the time slot in the silent state allows the communication state of all the time slots of the control carrier to be checked during communication with the first base station, wherein upon occurrence of one of detecting deterioration of a reception level of the communication channel during communication, and when detecting the control slot on the control carrier whose reception level is stronger than that of the communication channel during communication, the first base station is changed to said second base station.

8. A mobile station for use with a mobile communication system providing a service area by a plurality of base stations each providing a radio zone in which said mobile station communicates with the base station using a Time-Division Multiple Access transmission system, said mobile station including:

a control slot carrier level monitoring circuit for observing each control time slot for monitoring communication states between the mobile station and base stations adjacent the mobile station during time periods other than a time period for a speech time slot currently being used, wherein communication states between the mobile station and all of the base stations adjacent said mobile station are checked while said mobile station is communicating with a first base station;

a demodulator for detecting a silent period, during which no voice signal exists, in a predetermined time interval in a speech time slot;

a VOX period control carrier level monitoring circuit for observing a control time slot for monitoring communication states between the mobile station and a base station, whose control time slot is in the same timing as the speech time slot currently being used, during silent periods when said demodulator has detected a silent state;

a received state monitoring circuit for monitoring a communication quality of a speech channel; and a speech channel changeover control circuit for changing over a base station from which a best communication state is obtained on the basis of observation results of said control slot carrier level monitoring circuit and VOX period control carrier level monitoring circuit, wherein said VOX period control carrier level monitoring circuit comprises an upward VOX period control carrier level monitoring circuit and a downward VOX period control carrier level monitoring circuit, and wherein said speech changeover control circuit selects an optimum base station as a target base station for changing over based on monitored results of the upward and downward VOX period control carrier level monitoring circuits and said control slot carrier level monitoring circuit.

said mobile station further comprising a received state monitoring circuit, coupled to said demodulator, for monitoring a communication quality of said speech channel.

9. The mobile station according to claim 8, wherein when the speech channel changeover control circuit is notified of deterioration of the communication quality of the speech channel from the received state monitoring circuit, said speech channel changeover control circuit changes over the speech channel to the optimum base station selected based on the monitored results during communication.

10. The mobile station according to claim 9, wherein said demodulator detects whether a voice signal is in a silent state or not for each frame, and wherein said demodulator analyzes a top portion of a signal of a communication time slot for each cycle period, and discriminates whether said signal comprises one of voice, a VOX burst, and a VOX period, wherein when it is discriminated that the VOX period exists, the control carrier is measured during its burst period, whereby a voice signal is received even though a state is changed into a voice state from a time slot of a period succeeding the VOX burst.

11. The mobile station according to claim 10, wherein usage of the time slot in the silent state allows the communication state of all the time slots of the control carrier to be checked during communication with the first base station, wherein when one of detecting deterioration of a reception level of the communication channel during communication, and when detecting the control slot on the control carrier whose reception level is stronger than that of the communication channel during communication, the first base station is changed to said second base station.

12. The mobile station according to claim 11, wherein said first base station is changed to said second base station by said mobile station first originating a call to said second base station and then changing over the communication channel.

13. The mobile station according to claim 11, wherein said first base station is changed to said second base station by changing over the communication channel, without said mobile station first originating a call to said second base station.

* * * * *